3,272,860
PREPARATION OF METHIONINE ANALOGUES
Hans L. Nufer, St. Louis, Mo., assignor to Monsanto Company, a corporation of Delaware
No Drawing. Filed Apr. 2, 1964, Ser. No. 356,946
4 Claims. (Cl. 260—535)

This application is a continuation-in-part of application Serial No. 162,990, filed December 28, 1961, by Hans L. Nufer, now abandoned.

This invention relates to improvements in the preparation of methionine analogues. More specifically, the invention is directed to a novel procedure for preparng the calcium salt of the hydroxy analogue of methionine in very pure form.

The hydroxy analogue of methionine is a well-known chemical compound which is otherwise described as 2-hydroxy-4-(methylthio)butyric acid. This compound is known to have nutrient values equivalent to the corresponding aminoacid, methionine. The calcium salt of this aminoacid is also well known and it is usually in this form that it is used in feed compositions.

The parparations of the hydroxy analogues of methionine and salts thereof are effected by procedures similar to those used in the preparation of methionine. Acrolein is condensed with methyl mercaptan to form the corresponding cyanohydrin 2-hydroxy-4-(methylthio)butyronitrile. At this point the procedure differs from the synthesis of methionine and the conventional amination step is eliminated. The above-described cyanohydrin is then directly hydrolyzed to form the hydroxy analogue of methionine.

It has been found that in the normal preparation of this compound, polymers are formed by the interreaction of the hydroxyl and the carboxylic acid functions of separate molecules of the hydroxy acid. Some of the polymerization takes place during the hydrolysis step, especially if the hydrolysis is conducted at elevated temperatures. The polymerization also continues if the product is allowed to stand even at room temperatures.

The polymer formation is objectionable because the polymerized acids are not useful as feed components. However, if the hydroxy analogues of methionine or the calcium salts are assayed by conventional procedures, the total monomer and polymer content will be determined and recorded as "methionine hydroxy analogue." Thus, this assay is not useful in estimating the nutrient value. It has been found that any water-immiscible organic solvent extraction procedure will effect the extraction of both monomer and polymer and subsequent neutralization with lime does not provide a separation of the nutrient compounds from the polymers.

The present invention is directed to a procedure for separating the polymers from the monomers and thereby enabling the production of a product having over 98% in the monomeric form. Although the prior art literature describes the production of a product containing 97% methionine hydroxy analogue, this content includes both the monomer and the several polymers known to be present.

In accordance with this invention it has been found that if the salt formation is effected in the presence of an ethylene glycol monoalkyl ether, such as the monoethyl ether of ethylene glycol or the higher monoalkyl ethers of ethylene glycol including mono-isopropyl ether of ethylene glycol, the n-propyl ether of ethylene glycol and the several butyl ethers, particularly the mono-n-butyl ether of ethylene glycol, an effective separation of the monomer and the polymers is obtained. It has been found that when the crude hydroxy analogue of methionine is treated with the calcium hydroxide or calcium oxide in the presence of the described ethers of ethylene glycol, the polymeric calcium 2-hydroxy-4-(alkylthio)butyric acids are dissolved and the monomeric calcium salts are recovered substantially free of the polymers. The monoalkyl ethers of ethylene glycol treatment also separates other organic or inorganic impurities which are present as reaction by-products. The solvents useful in this procedure have the formula $HOC_2H_4$—O—R wherein R is alkyl of up to four carbon atoms.

To effect a substantial recovery of the 2-hydroxy-4-(methylthio)butyric acid as the monomeric calcium salt it is desirable to heat the reaction mixture of the calcium compound, the glycol monoalkyl ether and the crude acid at an elevated temperature to assure dissolution of the polymeric acids and salts. A temperature in excess of 60° C. may be used but preferably above 85° C. is desirable. The reaction should be conducted so as to consume substantially all of the calcium compound. By cooling to a temperature below 50° C. and preferably below 30° C., a substantial precipitate of the monomeric calcium 2-hydroxy-4-(methylthio)butyrate is produced. By filtering and washing the cake with the glycol monoalkyl ether the salt will be essentially in the monomeric form and free of the polymers and other impurities.

This high quality calcium 2-hydroxy-4-(methylthio)butyrate is a new chemical compound not disclosed in any printed publication. The calcium salts prepared by the prior art procedure usually have from 89 to 93 percent of the monomer and do not exceed 95%. The products are incapable of purification by recrystallization from water or organic solvents. It has been found that when recrystallized from water, the salt is extensively hydrated and contains a large number of units of water of crystallization. When recrystallization is attempted, the voluminous product occludes much of the mother liquor with its objectionable impurities. This problem cannot be avoided in the usual manner by increasing the volume of water because the calcium salt is soluble to the extent of about 10 percent. If sufficient water is added in the amount required to reduce the occluded impurities to the acceptable minimum the desired calcium salt is substantially, if not entirely, redissolved. The novel procedure enables the preparation of a more active compound on the weight basis, because the inactive components and the odor and color-forming bodies have been removed. Many prior art workers were not aware of either the existence or the identity of the described impurities.

Further details of the preparation of the novel compounds are set forth in the following specific examples.

*Example 1*

2-hydroxy-4-(methylthio)butyric acid prepared by the acid hydrolysis of 2-hydroxy-4-(methylthio)butyronitrile (67.4 parts by weight) is mixed with 19.5 parts of the monoethyl ether of ethylene glycol. A 14.8 parts by weight lot of calcium oxide is slurried in 195 parts of monoethyl ether of ethylene glycol, and gradually mixed with the solution of the said acid over a period of an hour while maintaining the temperature at 90° C. to adjust the pH to 8 to 10. The mixture is maintained at 100° C. for one hour and then allowed to cool. At 25° C. the slurry is filtered and the filter cake washed twice with 50 parts of monoethyl ether of ethylene glycol and then dried at 80° C. The resulting calcium salt assays at 98.5 percent of monomeric calcium 2-hydroxy-4-(methylthio)butyrate.

*Example 2*

The procedure of Example 1 is repeated except that the 2-hydroxy-4-(methylthio)butyric acid from the hydrolysis is diluted with water to 70% acid content. The slurry of calcium oxide in monoethyl ether of ethylene glycol is then added at 85° C. to 90° C. and allowed to cool to room temperature. The resulting precipitate is separated by filtering and found to consist essentially of monomeric calcium 2-hydroxy-4-(methylthio)butyrate.

*Example 3*

The procedure of Example 1 is repeated except that the reaction mixture from the hydrolysis of 2-hydroxy-4-(methylthio)butyronitrile is directly treated with a slurry of calcium oxide in anhydrous ethylene glycol monoethyl ether. The mixture is heated at 100° C. for an hour and cooled to approximately room temperature. By filtering the mixture a solid product, calcium 2-hydroxy-4-(methylthio)butyrate, is obtained which is essentially free of polymeric 2-hydroxy-4-(methylthio)butyric acid salts.

Although the invention is described with respect to the above specific embodiment, it is not intended that the details thereof shall be limitations on the scope of the invention except to the extent incorporated in the appended claims.

What is claimed is:

1. The process of preparing high quality monomeric calcium 2-hydroxy-4-(methylthio)butyrate which comprises contacting an aqueous solution of 2-hydroxy-4-(methylthio)butyric acid with a calcium compound of the group consisting of calcium oxide and calcium hydroxide in the presence of a compound of the structure

R—OCH$_2$CH$_2$—OH wherein R is an alkyl group having one to four carbon atoms and filtering the resulting slurry of the monomeric calcium 2-hydroxy-4-(methylthio)butyrate.

2. The process of preparing high quality monomeric calcium 2-hydroxy-4-(methylthio)butyrate which comprises contacting an aqueous solution of 2-hydroxy-4-(methylthio)butyric acid with a calcium compound of the group consisting of calcium oxide and calcium hydroxide in the presence of monoethyl ether of ethylene glycol.

3. The procedure of preparing polymer-free crystalline calcium 2-hydroxy-4-(methylthio)butyrate which comprises diluting the 2-hydroxy-4-(methylthio)butyric acid prepared by the HCl hydrolysis of 2-hydroxy-4-(methylthio)butyronitrile with a solvent of the formula HO—CH$_2$CH$_2$—OR wherein R is alkyl of up to four carbon atoms, slurrying the mixture with a stoichiometric quantity of calcium oxide and filtering.

4. The procedure of preparing monomeric calcium 2-hydroxy-(methylthio)butyrate of at least 98 percent purity which comprises contacting 2-hydroxy-4-(methylthio)butyric acid with calcium oxide in the presence of ethylene glycol monoethyl ether, heating the mixture to a temperature above 60° C., and cooling the mixture until a substantial volume of the desired calcium 2-hydroxy-4-(methylthio)butyrate is formed.

References Cited by the Examiner

UNITED STATES PATENTS

| | | | |
|---|---|---|---|
| 2,808,436 | 10/1957 | Anagnostopoulos | 260—535 |
| 2,938,053 | 5/1960 | Blake et al. | 260—535 X |
| 3,175,000 | 3/1965 | Gielkens et al. | 260—535 |

FOREIGN PATENTS 915,193   1/1963   Great Britain.

LEON ZITVER, *Primary Examiner.*